United States Patent [19]

Hoffman et al.

[11] Patent Number: 4,719,316

[45] Date of Patent: Jan. 12, 1988

[54] SPLICE FOR PUSHING AND PULLING CABLE

[75] Inventors: Ernest G. Hoffman, Middlefield; David H. Neuroth, Hamden; Fernando Tabak, Norwalk, all of Conn.

[73] Assignee: Hubbell Incorporated, Orange, Conn.

[21] Appl. No.: 913,849

[22] Filed: Sep. 30, 1986

[51] Int. Cl.[4] .............................................. H02G 15/08
[52] U.S. Cl. .................................... 174/88 R; 174/91; 174/92
[58] Field of Search ............. 174/88 R, 91, 92, 102 R, 174/103, 106 R, 108, 109, 117 F

[56] References Cited

U.S. PATENT DOCUMENTS

| | | | |
|---|---|---|---|
| 3,749,816 | 7/1973 | Shaw | 174/92 X |
| 3,796,823 | 3/1974 | Wright et al. | 174/92 |
| 4,262,703 | 4/1981 | Moore et al. | 174/47 |
| 4,315,099 | 2/1982 | Gerardot et al. | 174/47 |
| 4,374,530 | 2/1983 | Walling | 174/47 X |
| 4,408,092 | 10/1983 | Eatwell et al. | 174/88 |
| 4,453,036 | 6/1984 | Neuroth | 174/103 |
| 4,490,577 | 12/1984 | Neuroth | 174/103 |
| 4,496,795 | 1/1985 | Konnik | 174/84 R |
| 4,572,926 | 2/1986 | Ganssle et al. | 174/103 |
| 4,609,416 | 9/1986 | Himmelberger et al. | 174/103 X |
| 4,644,094 | 2/1987 | Hoffman | 174/103 X |

FOREIGN PATENT DOCUMENTS 66910 12/1982 European Pat. Off. .

OTHER PUBLICATIONS

Hoffman, E. G. et al.; Pushing and Pulling Cable; U.S. application Ser. No. 896,011, filed 8/13/86.

Primary Examiner—Morris H. Nimmo
Attorney, Agent, or Firm—Jerry M. Presson; Mark S. Bicks; Alfred N. Goodman

[57] ABSTRACT

A splice joins two pushing and pulling cables. Each cable has a plurality of gripping members defining a longitudinal cavity, a bendable power line housed in the cavity and elongated tensile elements enclosed and compressed by the gripping members. The adjacent ends of the tensile elements are connected by tensile element splices. Adjacent ends of the power lines are connected by a power line splice. A plurality of splice blocks are located end to end along the longitudinal axis, and enclose and compress the tensile element splices and the tensile element. The splice blocks define a longitudinally extending chamber housing the power line and the power line splice in a relatively stress free state.

30 Claims, 8 Drawing Figures

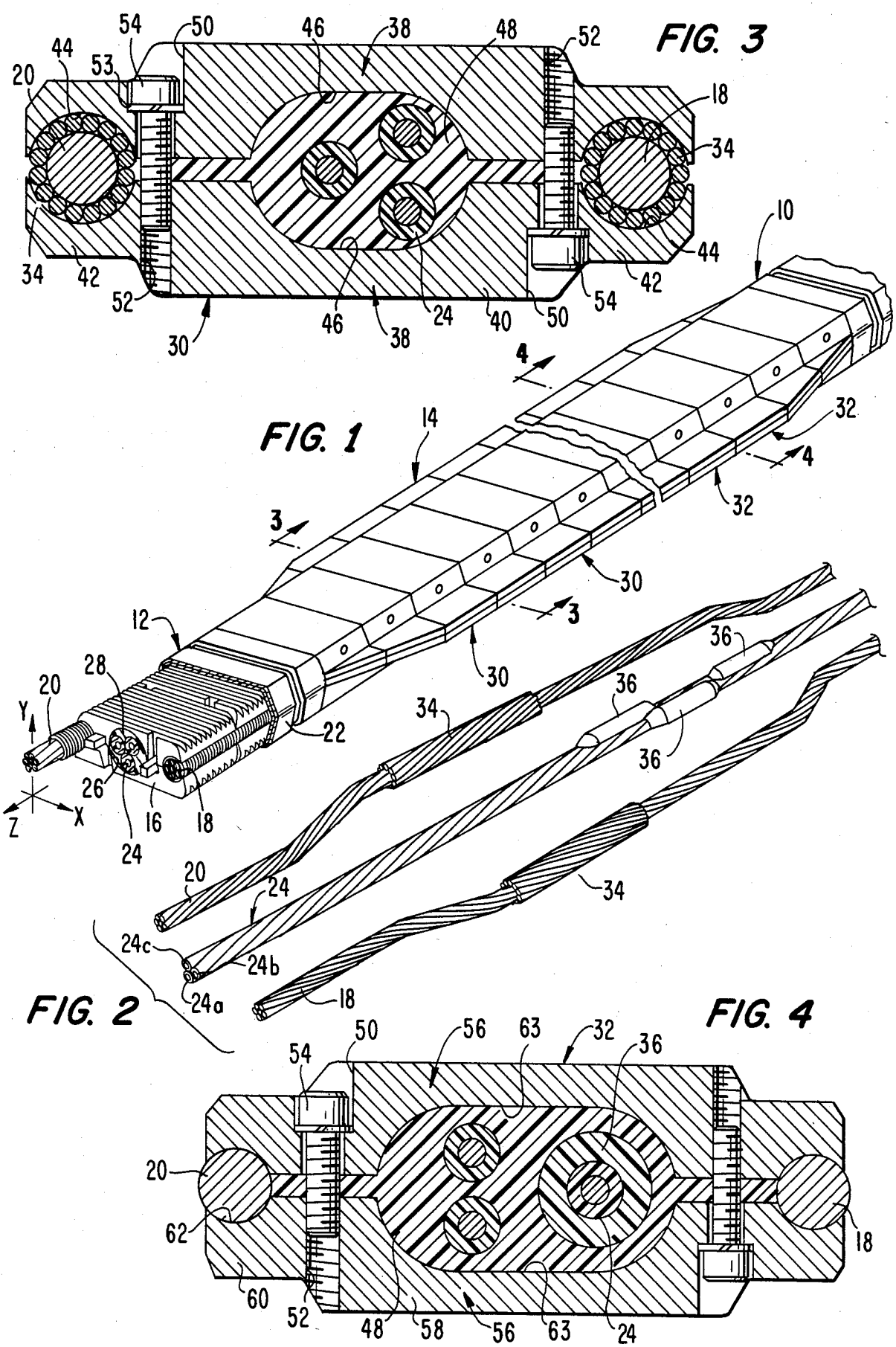

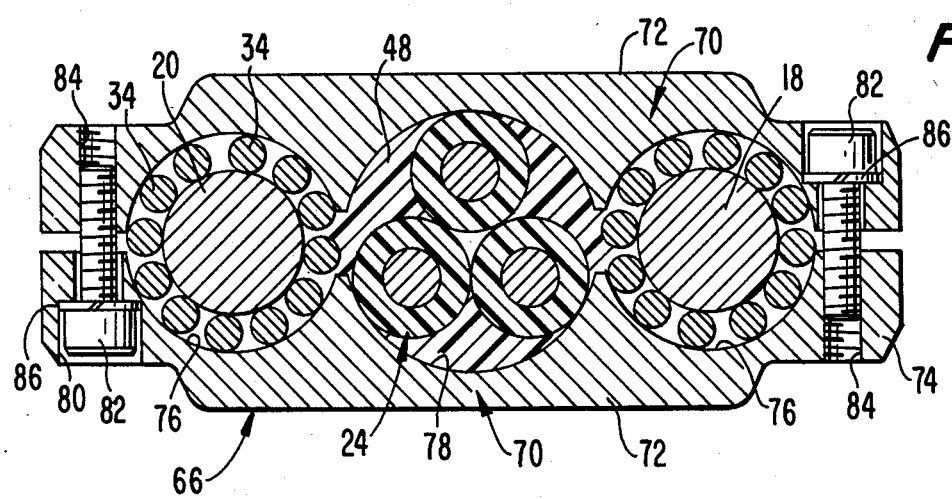
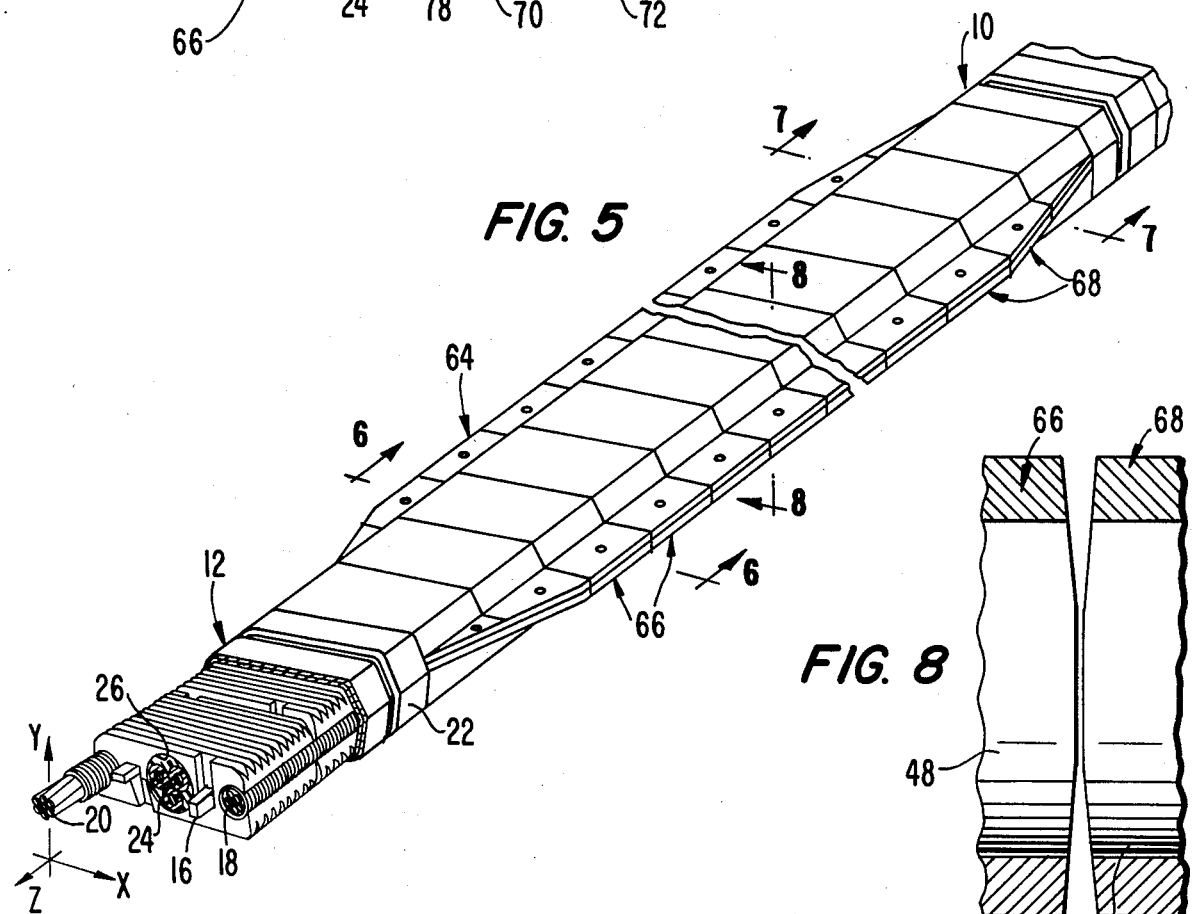
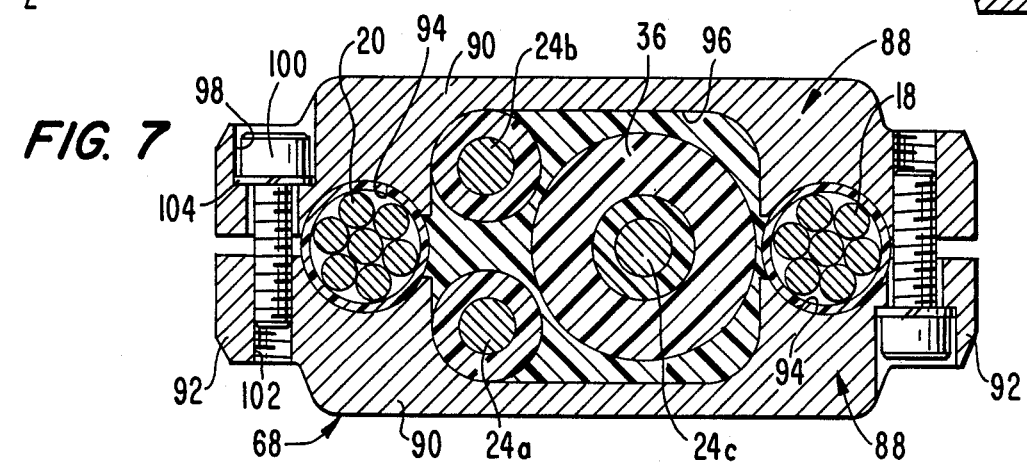

SPLICE FOR PUSHING AND PULLING CABLE

FIELD OF THE INVENTION

The present invention relates to a splice for a reinforced cable for pushing and pulling equipment attached to an end of the cable. The cable is especially constructed for deploying, suspending, operating and retrieving submersible pumps in oil wells. The cable of the present invention converts the components of external driving forces supplied to the cable exterior to longitudinal pushing and pulling forces to effect the deployment of the cable and the attached equipment in a bore hole or similar environment.

BACKGROUND OF THE INVENTION

Cables used in cable suspended pumping systems to install, operate and retrieve submersible equipment, particularly electrical submersible pumps, maybe flat and comprise a core of power and hauling lines surrounded by a helically-wound interlocked armor tape. This type of cable is disclosed in U.S. patent application Ser. No. 896,011 of Hoffman and Neuroth, filed Aug. 13, 1986 and entitled Pushing and Pulling Cable, the subject matter of which is hereby incorporated herein by reference.

The cable is pushed and pulled in the bore hole by a pair of coacting endless traction belts, typically used for driving tubing into and out of the bore hole. Since the traction belts engage the cable and force it into and out of the hole, it is advantageous for the height of the splice to be the same as the cable. Moreover, the splice must be able to effectively transmit both pushing and pulling forces without collapsing or breaking and without damage or strain being placed on the power line (for example, an electrical or hydraulic line) which is part of the cable.

SUMMARY OF THE INVENTION

An object of the present invention is to provide a splice for a pushing and pulling cable which is specifically constructed to permit use with a cable to push and pull equipment attached at one end of the cable through the bore hole of an oil well.

Another object of the present invention is to provide a splice for a pushing and pulling cable which can, like the cable, efficiently convert normal and longitudinal force components applied to the cable exterior by coacting drive means into cable pushing and pulling forces.

A further object of the present invention is to provide a cable splice which can be simply, quickly and effectively used to attach join or connect ends of pushing and pulling cable in the field.

The foregoing objects are obtained by a splice for a pushing and pulling cable having a longitudinal axis, comprising first and second cables to be joined, tensile element splicing means, power line splicing means and a plurality of splice blocks located end to end along the longitudinal axis. Each cable has a plurality of gripping members defining a longitudinal cavity, a bendable power line housed in the cavity and at least one elongated tensile element enclosed and compressed by the gripping members. The tensile element splicing means connects adjacent ends of the tensile elements of the first and second cables. The power line splicing means connects adjacent ends of the power lines of the first and second cables. The splice blocks enclose and compress the tensile element splicing means and the tensile element ends, and define a longitudinally extending chamber housing the power line splicing means and the power line ends.

By forming the splice in this manner, the splice blocks form vertebrae coupled to each other by the tensile element. The vertebrae articulate at their contact points and are bendable with the tensile element, and are longitudinally rigid forming axially rigid columns to permit exerting high magnitude pushing forces on the downstream portion of the cables, and hence, to the equipment attached to the down hole end of the cables.

In the splice, as well as in the cable, the electrical wire or hydraulic conduit for supplying power to the equipment suspended from the cable is contained within the individually incompressable splice blocks. Thus, the splice blocks protect the electric or hydraulic power lines from the high magnitude drive forces applied transversely to the splice members. Additionally, the splice blocks conform to and provide a uniform continuation of the cable periphery which engage the coacting belts such that the splice is fed through the driving system in the same manner as the cable and the driving system is not adversely affected.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which for a part of this disclosure:

FIG. 1 is a partial, perspective view of two cables attached by a splice according to a first embodiment of the present invention;

FIG. 2 is a partial, perspective view of the tensile ropes and power lines of the cables and splice of FIG. 1.

FIG. 3 is an end elevational view in section taken along lines 3—3 of FIG. 1;

FIG. 4 is an end elevational view in section taken along lines 4—4 of FIG. 1;

FIG. 5 is a partial, perspective view of two cables attached by a splice according to a second embodiment of the present invention;

FIG. 6 is an end elevational view in section taken along lines 6—6 of FIG. 5;

FIG. 7 is an end elevational view in section taken along lines 7—7 of FIG. 5; and FIG. 8 is a partial, side elevational view, in section of the splice taken along lines 8—8 of FIG. 5.

DETAILED DESCRIPTION OF PREFERRED EMBODIMENTS

Referring initially to FIG. 1, the present invention comprises a flat cable 10 joined to another flat cable 12 by a splice 14. Each of the cables are formed in the manner described in copending application Ser. No. 896,011 filed Aug. 13, 1986. These cables will only be briefly described herein.

Each cable comprises a plurality of longitudinally interconnected gripping members 16 forming a vertebrae assembly. First and second hauling lines or tensile ropes 18 and 20 are disposed within and are compressed by gripping members 16. Bendable armor tape 22 is wrapped about gripping members 11 and forms the exterior of each cable. Parallel to and laterally between tension ropes 18 and 20 is a protected power conveying line 24. In the illustrated embodiment, the power line comprises three electrical lines 24a, 24b and 24c, as illustrated in FIG. 2. The individual lines can be helically-wound around each other and form an electrical or hydraulic system within the cable structure. The power line is located within a central cavity 26 of gripping members 16. Spaces between the gripping members and the power line 24 can be filled with an elastromeric filler 28.

Cables 10 and 12 can be bent about the X axis and along the longitudinal Z axis, to permit the cables to bend to a limited extent about a reel. However, the cables are relatively rigid along the longitudinal axis to permit ti to be pushed down a bore hole. This rigidity on the Z axis is provided by the vertebrae arrangement and the containment provided by tubing through which the cable is deployed.

The first embodiment of the present invention will be discussed with reference to FIGS. 1-4. Splice 14 primarily comprises a plurality of splice blocks 30 and 32 arranged end to end along longitudinal axis Z. Splice blocks 30 and 32 differ somewhat in configuration as will be explained hereinafter.

Power lines 24 and ropes 18 and 20 from each of the two cables are connected in the manner illustrated in FIG. 2. Tensile ropes 18 and 20 are joined by splice rods 34, such as those manufactured by Performed Marine. The individual conductors of power line 24 are connected in a conventional manner by electrical aplices 36. The splice rods 34 are located generally laterally adjacent one another, i.e., at the same general position along longitudinal axis Z. However, splice rods 34 are spaced along the longitudinal axis from the electrical aplices 36. Additionally, each of the electrical splices 36 are axially spaced relative to each other. In this manner, the splices for the tension ropes will be in the splice block 30, while the electrical splices 36 will be housed in splices blocks 32 and be axially spaced from the block 30. Each of the electrical splices can be located in different sets of splice blocks 32.

Each splice block 30, as illustrated in FIG. 3, comprises a mating pair of substantially identical relatively rigid block parts 38. Each block part has a main body section 40 and a pair of laterally extending side flanges 42. Each side flange 42 has an inwardly open and generally semi-cylindrical recess 44 for receiving splice rods 34 and tension ropes 18 and 20.

A central recess 46, also of generally semi-cylindrical configuration, is located in body sections 38. The two central recesses 46 open toward each other and, along with the other splice blocks, define a longitudinally extending chamber within splice 14 for housing the power lines and the power line splices 36. Like the cavities in the cable gripping members, the chamber defined by recesses 44 can be filled with a suitable filler 48. The filler can be of any suitable material, for example, silicone rubber. This rubber preferably should cure at room temperature to facilitate assembly of the splice in the field.

Each block part 38 has a stepped cylindrical bore 50 which is unthreaded adjacent one side flange, and an internally threaded bore 52 adjacent the opposite side flange 42. when the block parts are assembled, one unthreaded bore 50 of one block part is located coaxially relative to one of the threaded bores 52 of the other block part. An externally threaded bolt 54 passes through each bore 50 and has its threaded shank threadedly engaged with one of the threaded bores 52. A lock washer 53 is provided underneath the head of each bolt 54 and bears against a shoulder located within stepped bore 50. The threaded engagement between bolts 54 and threaded bores 52 cause block parts 38 to compress against and positively engage splice rods 34 and ropes 18 and 20 such that the splice blocks will not move relative to ropes 18 and 20. As illustrated in FIG. 3, the splice blocks do not directly engage one another to permit the desired compression of the tension ropes.

The details of splice blocks 32 are illustrated in FIG. 4. This splice block directly engages the ropes 18 and 20 and houses the electrical splices 36 for power line 24. Splice block 32 includes block parts 56. Each block part 56 comprises a body section 58 and side flanges 60. Each side flange has a generally semi-cylindrical recess 62 for receiving one of the tensile ropes. Recesses 62 have a radius of curvature smaller than the radius of curvature of recesses 44 since recess 62 directly engage the tensile ropes, i.e., do not receive the splice rods 34.

The body sections are formed with cylindrical central recesses 63. Recesses 63 are somewhat larger than recesses 46 of splice block 30 to provide additional room for receiving electrical splices 36. Splice blocks 32 also include stepped cylindrical bores 50, threaded bores 52 and bolts 54 in the same manner as described above in connection with splice blocks 30. Additionally, filler material 48 is provide in the longitudinally extending chamber defined by recesses 63.

Body sections 40 and 58 have transverse peripheral configurations substantially equal to the gripping members 16 and armor 22 of cables 10 and 12. In other words,t he body sections 40 and 58 have dimensions along the X and Y axes substantially equal to corresponding dimensions of the cable. The flanges have a thickness in the Y axis direction substantially less than the main body sections. In this manner, splice 14 can be suitable engaged by the cleats of the driving belts in the same manner as the cleats engage the cables 10 and 12, without presenting obstructions which would interfere with the driving mechanism. The flanges, in being adequately spaced from the upper and lower surfaces of the splice blocks, would not interfere with the driving mechanism operation. The flanges on the splice blocks adjacent to the cables taper in width toward longitudinal ends of the plurality of splice blocks (in the direction of the X axis). This facilitiates the feeding of the cables.

The length of the splice along the longitudinal Z axis can be of any desired length by the use of the appropriate number of splice blocks. In typical installations, the splice can be 10-15 feet long. A typical axial length of each block is approximately 1.30 inches. The blocks can be formed of any suitable material, but are usually formed of steel or plastic for corrosion resistance and rigidity.

When the splice blocks are compressed, they will more tightly engage the tension ropes 18 and 20. The location of the poer line within the longitudinal chamber formed by the central recesses will protect the power line, even when the splice blocks are subjected to high transverse compressive loads in X and Y directions. The axial tensile loads will be borne by the tension ropes 18 and 20. Axial compressive loads will be supported by the splice lbocks themselves. In this manner, forces in all directions will be relieved by parts other than the power line such that the power line will remain in an essentially unstressed condition, regardless of the forces applied to the cables 10 and 12 and the splice 14.

A second embodiment of the present invention is disclosed in connection with FIGS. 5-7. The main difference between the first and second embodiments is the relative positioning of the bolts coupling the block parts relative to the ropes 18 and 20. In the first embodiment of FIGS. 1-4, the bolts are laterally between the tensile ropes and the power line 24, while in the embodiment of FIGS. 5-7, the tensile ropes 18 and 20 are located laterally between bolts and power line 24. By the arrangement of the second embodiment, the portions of ropes 18 and 20 in the splice can be arranged more coaxially with those portions in the cables, than in the first embodiment, for improved stress transfer.

More specifically in the second embodiment, cables 10 and 12 are coupled by a splice 64. Splice 64 is primarily comprised of two types of splice blocks 66 and 68. Splice blocks 66 are for receiving the splices connecting the tensile ropes, while the splices blocks 68 house the splices for power line 24. As described in connection with the first embodiment, the ropes 18 and 20 are joined by splice rods 34. The lines 24a, 24b, and 24c of power line 24 are connected by electrical splices 36.

Splice block 66 comprises block parts 70 which are essentially identical to each other. Each block part 70 comprises a main body section 72 and laterally extending side flanges 74. The main body section comprises two generally semi-cylindrical recesses 76 receiving splice rods 34 and tension cables 18 and 20. Between recess 76, generally semi-cylindrical central recesses 78 are provided for receiving power line 24 and filler 48. Recesses 78 define a longitudinally extending chamber for the power lines. The recesses 76 can have a radius of curvature of approximately 0.4595 inch to tightly engage the splice rods and the ropes 18 and 20 and avoid direct contact of block parts 70.

In each block part, one side flange 74 has a stepped cylindrical bore 80 for loosely receiving bolt 82. The other flange has an internally threaded bore 84 which threadily engages the threaded shank of bolt 82. A lock washer 86 is provided under the head of the bolt. The threaded engagement between bolts 82 and bores 84 at the opposite ends of the splice block tightly press block parts 70 against the tension cables without compressing power line 24. In this manner, compressive and tensile stresses in all directions will be relieved by the blocks or the tension ropes, and not by the power line.

Splice block 68 is formed of two essentially identical block parts 88. Each block part comprises a main body section 90 and laterally extending side flanges 92. The main body section comprises generally semi-cylindrical recesses 94 for receiving tensile ropes 18 and 20. The recesses 94 have a radius of curvature of about 0.287 inch. An enlarged central recess 96 is provided between recesses 94 for receiving power line 24 and the power line splices 36.

In each block part, one flange is provided with a stepped cylindrical bore 98 receiving a bolt or externally threaded fastener 100. The other flange is provided with an internally threaded bore 102. A lock washer 104 is provided under the head of the bolt.

Block parts 88 are oriented relative to each other such that each stepped bore 98 is aligned with the threaded bore 102 of the opposite block part. This aligns the recesses 74 to provide passageways for receiving and retaining tensile ropes 18 and 20. Recesses 96 are also aligned to provide an enlarged central cavity which extends longitudinally through all of the blocks of splice 64 for receiving the power line and power line splices in a relatively stress free state. The tensile ropes are gripped and compressed by the block parts such that the block parts do not engage each other.

As in the first embodiment, the splice blocks 66 and 68 have block parts with main body sections having transverse peripheral configurations substantially equal to those of cables 10 and 12 attached by splice 64. The flanges have a thickness in the direction of the Y axis substantially less than the main body sections. The flanges of the splice blocks which are adjacent the cables taper in the direction of X axis toward the cables. This provides tapered lead end sections at each end of splice 64.

FIG. 8 illustrates a typical joint between two splice blocks viewed along the X axis in the Y-Z plane. This shows a slight taper at the longitudinal ends of the blocks, for example, a two percent taper leading into a flat central area. This configuration of the blocks facilitates, to a limited extent, the bending of the splice along with the cable. Generally, in this regard, the splice blocks have a configuration similar to that of the gripping members of cables 10 and 12.

While various embodiments have been chose to illustrate the invention, it will be understood by those skilled in the art that various changes and modifications can be made therein without departing from the scope of the invention as defined in the appended claims.

What is claimed is:

1. A spliced pushing and pulling cable having a longitudinal axis, comprising:

first and second cables, each of said cables having a plurality of gripping members defining a longitudinal cavity, a bendable power conveying line housed in said cavity, a bendable power conveying line housed in said cavity and at least one elongated tensile element enclosed and compressed by said gripping members;

tensile element splicing means connecting adjacent ends of the tensile elements of said first and second cables;

power conveying line splicing means connecting adjacent ends of said power conveying lines of said first and second cables; and a plurality of splice blocks located end to end along the longitudinal axis enclosing and compressing said tensile element splicing means and said tensile element ends, said blocks defining a longitudinally extending chamber housing said power conveying line splicing means and said power conveying line ends.

2. A spliced cable according to claim 1 wherein each of said splice blocks comprises a mating pair of block parts, and coupling means connecting said block parts of each pair and pressing said block parts against said tensile elements and said tensile element splicing means.

3. A spliced cable according to claim 2 wherein said coupling means comprises externally threaded bolts and mating internally threaded bores in said block parts.

4. A spliced cable according to claim 2 wherein the block parts of each of said splice blocks are substantially identical.

5. A spliced cable according to claim 2 wherein said block parts comprise substantially semi-cylindrical recesses receiving said tensile elements and said tensile element splice means.

6. A spliced cable according to claim 5 wherein said coupling means are laterally between said recesses and said chamber.

7. A spliced cable according to claim 5 wherein said recesses are laterally between said coupling means and said chamber.

8. A spliced cable according to claim 2 wherein said block parts comprise pairs of parallel recesses receiving parallel pairs of tensile elements and tensile element splice means.

9. A spliced cable according to claim 2 wherein said block parts comprise main body sections and side flanges extending laterally therefrom, said main body sections having a transverse peripheral configuration substantially equal to said gripping members, said flanges having a thickness substantially less than said main body sections.

10. A spliced cable according to claim 9 wherein said flanges of said splice blocks adjacent said cables taper in width toward longitudinal ends of said plurality of splice blocks.

11. A spliced cable according to claim 1 wherein said splice blocks comprise main body sections and side flanges extending laterally therefrom, said main body sections having a transverse peripheral configuration substantially equal to said gripping members, said flanges having a thickness substantially less than said main body sections.

12. A spliced cable according to claim 11 wherein said flanges of said splice blocks adjacent to said cables taper in width toward said cables.

13. A spliced cable according to claim 1 wherein each of said cables comprises a pair of tensile elements and a plurality of power conveying lines laterally between said tensile elements, said tensile element splicing means being spaced along the longitudinal axis from said power conveying line splice means and located in different splice blocks therefrom.

14. A spliced cable according to claim 13 wherein each of said power conveying lines comprise separate power conveying lines splice means which are spaced at different locations along the longitudinal axis and located in different splice blocks.

15. A spliced cable according to claim 1 wherein said tensile element splicing means comprise splice rods.

16. A spliced cable according to claim 1 wherein said tensile elements in said splice blocks and in said gripping members are substantially coaxial.

17. A spliced cable according to claim 1 wherein said chamber is filled with insulation.

18. A spliced pushing and pulling cable having a longitudinal axis, comprising:
first and second cables, each of said cables having a plurality of gripping members defining a longitudinal cavity, a bendable power conveying line housed in said cavity, a pair of parallel elongated tensile ropes enclosed and compressed by said gripping members, and an external layer of armor;
tensile rope slicing means connecting adjacent ends of said tensile ropes of said first and second cables;
power conveying line splicing means connecting adjacent ends of said power conveying lines of said first and second cables; and
a plurality of splice blocks located end to end along the longitudinal axis enclosing and compressing said ropes and said tensile rope splicing means, each of said splice blocks defining a portion of a longitudinally extending chamber housing said power conveying line splicing means and said power conveying lines, each of said splice blocks having a mating pair of block parts and threaded bolt means for coupling said block parts of each pair and pressing said block parts against said tensile ropes.

19. A spliced cable according to claim 18 wherein said block parts comprise main body sections and side flanges extending laterally therefrom, said main body sections having a transverse peripheral configuration substantially equal to said armor, said flanges having a thickness substantially less than said main body sections.

20. A spliced cable according to claim 19 wherein said flanges of said splice blocks adjacent said cables taper in width toward longitudinal ends of said plurality of splice blocks.

21. A kit for splicing first and second pushing and pulling cables, each of the cables having a plurality of gripping members defining a longitudinal cavity, a bendable power conveying line housed in the cavity and at least one elongated tensile element enclosed and compressed by the gripping members, the cables extending along a longitudinal axis, the kit comprising:
tensile element splicing means for connecting adjacent ends of the tensile elements of the first and second cables;
power conveying line splicing means for connecting adjacent ends of the power lines of the first and second cables; and
a plurality of splice blocks, locatable end to end along the longitudinal axis, for enclosing and compressing said tensile element splicing means and the tensile element ends, said blocks defining a longitudinally extending chamber housing said power conveying line splicing means and the power conveying line ends.

22. A kit according to claim 21 wherein each of said splice blocks comprises a mating pair of block parts, and coupling means for connecting said block parts of each pair and for pressing said block parts against the tensile elements and said tensile element splicing means.

23. A kit according to claim 22 wherein said coupling means comprises externally threaded bolts and mating internally treaded bores in said block parts.

24. A kit according to claim 22 wherein the block parts of each of said splice blocks are substantially identical.

25. A kit according to claim 22 wherein said block parts comprise substantially semi-cylindrical recesses receiving the tensile elements and said tensile element splice means.

26. A kit according to claim 25 wherein said coupling means are laterally between said recesses and said chamber.

27. A kit according to claim 25 wherein said recesses are laterally between said coupling means and said chamber.

28. A kit according to claim 22 wherein said block parts comprise pairs of parallel recesses for receiving parallel pairs of tensile elements and tensile element splice means.

29. A kit according to claim 21 wherein said block parts comprise main body sections and side flanges extending laterally therefrom, said main body sections having a transverse peripheral configuration substantially equal to the gripping members, said flanges having a thickness substantially less than said main body sections.

30. A kit according to claim 29 wherein said flanges of some of said splice blocks adjacent said cables taper in width.

* * * * *

UNITED STATES PATENT AND TRADEMARK OFFICE
CERTIFICATE OF CORRECTION

PATENT NO. :  4,719,316

DATED      :  January 12, 1988

INVENTOR(S):  Ernest G. Hoffman et al.

It is certified that error appears in the above-identified patent and that said Letters Patent is hereby corrected as shown below:

```
    Column 3, line 28, "Performed Marine", should
read -- Preformed Marine --.

Column 6, lines 34-35, ", a bendable power conveying
line housed in said cavity" should be omitted.
```

Signed and Sealed this

Twenty-fourth Day of May, 1988

Attest:

DONALD J. QUIGG

*Attesting Officer*  *Commissioner of Patents and Trademarks*